United States Patent [19]

Tronzano

[11] Patent Number: 4,791,502

[45] Date of Patent: Dec. 13, 1988

[54] APPARATUS FOR POSITIONING A READING-RECORDING HEAD ON A DISC

[75] Inventor: Sergio Tronzano, Caluso, Italy

[73] Assignee: Ing. C. Olivetti & C., S.p.A., Ivrea, Italy

[21] Appl. No.: 21,506

[22] Filed: Mar. 4, 1987

[30] Foreign Application Priority Data

Mar. 5, 1986 [IT] Italy .................. 67179 A/86

[51] Int. Cl.[4] .................. G11B 5/55; G11B 21/10
[52] U.S. Cl. .................................. 360/106
[58] Field of Search ......................... 360/106

[56] References Cited

U.S. PATENT DOCUMENTS

| 3,881,189 | 4/1975 | Mayeda | 360/106 |
| 4,161,004 | 7/1979 | Dalziel | 360/106 |
| 4,323,939 | 4/1982 | Iftikar et al. | 360/106 |
| 4,672,491 | 6/1987 | Koenig et al. | 360/106 |

Primary Examiner—Robert S. Tupper
Attorney, Agent, or Firm—Banner, Birch, McKie & Beckett

[57] ABSTRACT

A magnetic head is mounted on a carriage which is movable radially with respect to a disc. The carriage is slidable on two balls rolling in a groove in a guide pivoted to the base and pressed against the carriage by a spring. The carriage is moved by a drive roller which rolls against a track on the carriage opposite to the guide.

The roller is connected to the carriage by means of a flexible metal strip which is fixed to the roller at the center and to the carriage at its ends. The guide which is pivoted on the base makes it impossible automatically to take up clearances between the carriage and the guide. The carriage may be of very small dimensions and weight so that the reduced inertia of the carriage enhances the degree of precision of the movements of the head from one track on the magnetic disc to another.

8 Claims, 1 Drawing Sheet

APPARATUS FOR POSITIONING A READING-RECORDING HEAD ON A DISC

BACKGROUND OF THE INVENTION

The present invention relates to an apparatus for reading and/or recording data on a rotating disc, comprising a transducer for reading and/or recording data on the disc, the transducer being mounted on a carriage which is movable in a radial direction with respect to the disc along a guide mounted on a base and urged against the carriage by a resilient member interposed between the guide and the base, and a drive roller for moving the carriage on the guide.

In a known apparatus, disclosed in U.S. Pat. No. 4,323,939, the carriage is slidable on two parallel cylindrical guides by means of three rollers which are disposed in a triangular configuration; one roller rolls against one of the guides while the other two rollers roll against the other guide. One of the two guides is fixed to the base while the other guide is movable, being mounted on a resilient member which presses the movable guide against the corresponding roller. The carriage is moved by a drive roller having its axis of rotation parallel to the plane passing through the two guides by means of a flexible strip which is wound around the roller and fixed to the carriage. That arrangement is bulky and of substantial weight due to the provision of the three rollers and the two guides.

In another known apparatus, shown in U.S. Pat. No. 3,881,189, the carriage is formed by a cylindrical bar which is slidable between two fixed supports. The cylindrical bar is moved by a drive roller and by a metal strip which is wound around the roller and which is fixed at its ends to two spaced collars which are fixed to the bar.

The roller rolls on a resilient metal plate which is fixed at its one end to one of the two collars, parallel to the axis of the bar, to apply a resilient force to the bar for the purpose of taking up clearances caused by wear of the bar relative to the supports.

A further resilient strip is connected between the bar and the supports to prevent the bar from rotating about its axis. Since the bar is slidable on the fixed supports, that arrangement may involve abnormal conditions of sliding movement due to unpredictable variations in the level of stiction, with resulting inaccuracies in the micro-metric movements of the bar.

SUMMARY OF THE INVENTION

The object of the present invention is to provide an apparatus for reading and/or recording data on a rotating disc which does not suffer from the above-indicated disadvantages and in particular with moving members with a low level of inertia and capable of producing micrometric movements with a high degree of accuracy.

A further object of the invention is to provide an apparatus for reading and/or recording data on a rotating disc wherein at least two rolling elements are interposed between the carriage and the guide to support and guide the carriage in the said direction, the roller being capable of resisting the thrust of the guide, arising from the resilient member.

These and other features will be more clearly apparent from the following description of a preferred embodiment which is given by way of non-limiting example, with reference to the accompanying drawings.

DETAILED DESCRIPTION OF THE PREFERRED EMBODIMENT

Figure 1:
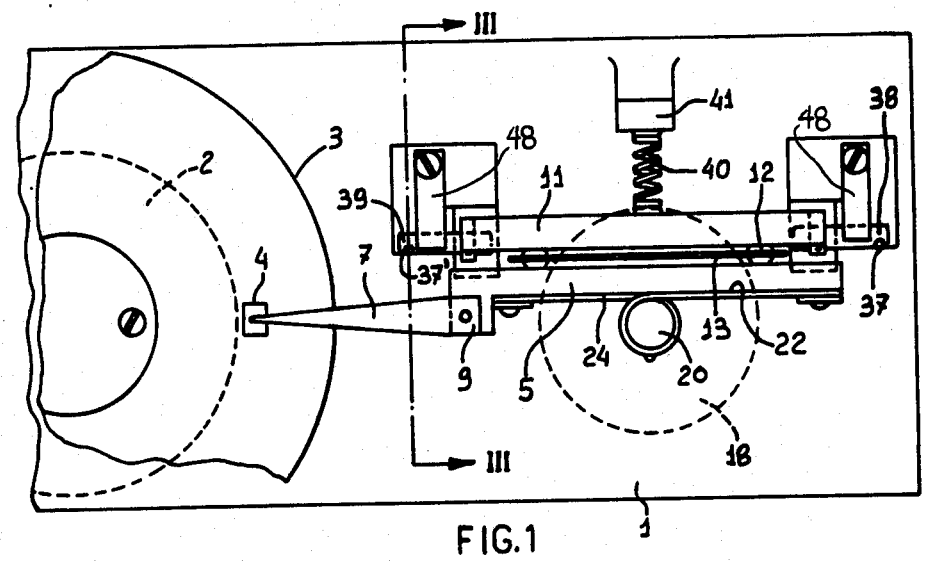
FIG. 1 is a plan view of part of the apparatus according to the invention.
Figure 2:
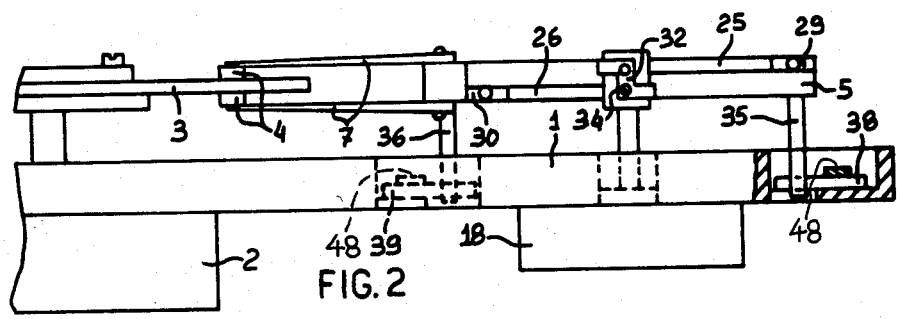
FIG. 2 is a side view of the apparatus shown in FIG. 1.
Figures 3, 4:
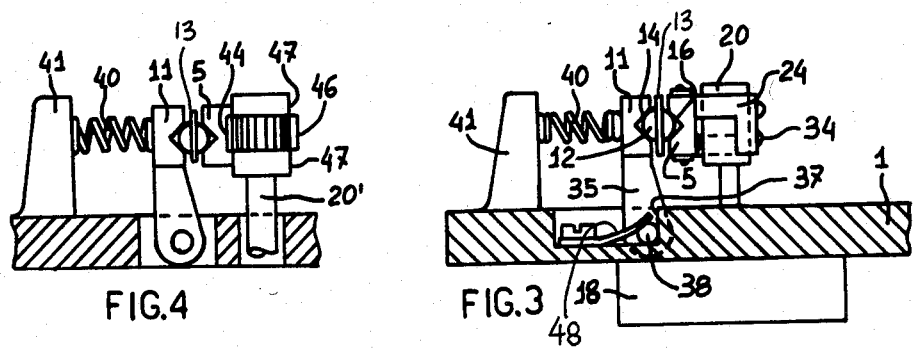
FIG. 3 is a view in section taking along line III—III in FIG. 1.
FIG. 4 is an alternative form of the detail in FIG. 3.

Referring to FIGS. 1 to 3, fixed on a base 1 is a d.c. motor 2 of brushless type, which rotates a rigid disc 3. The disc 3 may be of magnetic or optical type.

The data are contained along the concentric tracks provided on the two surfaces of the disc 3 and spaced from each other at about 25 μm. The data are read or recorded from or on to the two faces of the disc 3 by a pair of magnetic transducers 4 mounted on a carriage 5 in cantilever relationship. The transducers 4 are supported on the distant ends of two resilient arms 7 which are fixed to the carriage 5 at their proximal ends 9. The carriage 5 is slidable on a guide 11 in a radial direction with respect to the disc 3 and parallel to the recording surfaces thereof. The carriage 5 and the guide 11 are provided with two parallel grooves 14 and 16 between which are housed two rolling elements 12 which are held at a spacing from each other by a retainer cage 13, for the purpose of supporting and guiding the carriage 5.

The two grooves 14 and 16 are of V-shaped cross-sectional configuration, with a 90° angle. The two rolling elements 12 may be balls or alternatively pairs of inclined cylindrical rollers.

The carriage 5 is moved by a stepping motor 18 by means of a roller 20 which rolls without sliding against a flat rolling track 22 on the carriage 5, opposite to and parallel to the groove 14. In order to ensure that the carriage 5 is reliably driven by the roller 20, the latter is connected to the carriage 5 by means of a flexible and inextensible strip 24 which is cranked at its centre so as to provide two runs 25 and 26 which are parallel to but offset from each other. The strip 24 is fixed to the carriage 5 at its ends 29 and 30 and is wound through 360° around the roller 20. The central portion 32 of the strip 24 is fixed to the roller 20 by pins 34.

The guide 11 is provided with two arms 35 and 36 which are hinged to the base 1 by means of pins 38 and 39 which are held in position against two shoulders 37 and 37' by the pressure of two leaf springs 48. The guide 11 is held in a position of being pressed against the rolling elements 12 by a spring 40 which is disposed between a projection 41 on the base 1 and the guide 11.

The thrust applied by the guide 11 to the carriage 5 is resisted by the roller 20 since the spring 40 acts in a direction which is perpendicular to the movement of the carriage and which passes through the axis of rotation of the roller 20.

In an alternative construction, the strip 24 (FIG. 1) may be replaced by a rack 44 (FIG. 4) which is fixed with respect to the carriage 5 and which is engaged with a sprocket 46 interposed between two cylindrical zones 47 on the roller 20'. In that way the sprocket 46 and the rack 44 reliably provide for drive movement for the carriage without slipping and the two zones 47 which roll against corresponding tracks on the carriage 5 resist the thrust of the spring 40.

Since no rolling element is mounted on the carriage 5, the carriage 5 may be of greatly reduced dimensions and weight, as a result of which the inherent inertia thereof has a negligible effect on the degree of accuracy of movement during the operation of searching for the tracks on the disc 3.

We claim:

1. Apparatus for positioning a reading-recording head relative to a rotating recording disc, comprising a rotary motor having rotating driving means and mounted on a base member of the apparatus, a carriage for said head moved by said driving means in a radial direction to position said head on said disc, a guide extending parallel to said radial direction and pivotally mounted on said base, said carriage and said guide each comprising one guiding groove, said grooves being faced to each other and parallel to said direction for accommodating two rolling elements to support and guide said carriage in said radial direction, and biasing means interposed between said guide and said base to urge the guide against the carriage, said rolling elements being located in said grooves at position spaced apart in opposite directions with respect to said driving means, whereby the thrust of said guide on said carriage arising from said biasing means is absorbed by said driving means.

2. Apparatus according to claim 1, wherein each of the rolling elements (12) comprises a pair of inclined rollers.

3. Apparatus according to claim 1, wherein each of the rolling elements (12) is a ball.

4. Apparatus according to claim 3, wherein said drive means include a drive roller (20) and a flexible metal strip (24) wound through 360° around said roller and fixed thereon at an intermediate point, said strip being interposed between the roller and the carriage and having end portions (25, 26) secured to the carriage and extending in opposite directions in contacting cooperation with a longitudinal track opposite with respect to said groove, said guide and said carriage being interposed between said biasing means and said roller, whereby the thrust of the biasing means is directed against the roller.

5. Apparatus according to claim 4, wherein the drive roller (20') comprises a toothed ring (46) interposed between two cylindrical zones (47) which roll against corresponding tracks on the carriage (5) parallel to the said direction, the toothed ring engaging with a rack (44) on the carriage, interposed between the tracks.

6. Apparatus according to claims 5 or 4, wherein said biasing means comprises a coil spring exerting on said guide a thrust along an axis perpendicular to and intersecting with the axis of rotation of said drive roller.

7. Apparatus according to claim 1, wherein said rolling elements are spaced apart from each other by means of a flat retainer cage (13) supported by said elements and extending between said guide and said carriage parallel to said radial direction.

8. Apparatus according to claim 7, wherein said guide is pivoted on said base on an axis parallel to said radial direction, said axis being spaced from the grooves of said guide substantially on the plane of said flat cage.

* * * * *